OR    3,976,355

United States

Matthews

[11] 3,976,355
[45] *Aug. 24, 1976

[54] OPTICAL COMMUNICATIONS SYSTEMS
[75] Inventor: Michael Robert Matthews, London, England
[73] Assignee: The Post Office, London, England
[ * ] Notice: The portion of the term of this patent subsequent to Sept. 2, 1992, has been disclaimed.
[22] Filed: Aug. 13, 1974
[21] Appl. No.: 497,094

[30] Foreign Application Priority Data
Aug. 24, 1973  United Kingdom........... 40221/73

[52] U.S. Cl. ................... 350/96 C; 350/96 WG
[51] Int. Cl.² ........................................ G02B 5/14
[58] Field of Search ............. 350/96 R, 96 B, 96 C; 339/42, 48, 49 R, 49 B

[56] References Cited
UNITED STATES PATENTS

| | | | |
|---|---|---|---|
| 1,394,057 | 10/1921 | Woernley | 339/48 X |
| 2,444,843 | 7/1948 | Modrey | 339/42 |
| 3,519,975 | 7/1970 | Prow et al. | 339/42 X |
| 3,734,594 | 5/1973 | Trambarulo | 350/96 C |
| 3,790,791 | 2/1974 | Anderson | 350/96 C X |
| 3,810,802 | 5/1974 | Buhite et al. | 350/96 C X |
| 3,867,679 | 2/1975 | Vanzetti et al. | 350/96 C X |
| 3,902,785 | 9/1975 | Matthews | 350/96 C |

Primary Examiner—David H. Rubin
Attorney, Agent, or Firm—Kemon, Palmer & Estabrook

[57] ABSTRACT

A coupler for optically connecting two lengths of dielectric optical waveguide has a plug and a socket. The socket consists of a sleeve having a first capillary bore tube rigidly fixed in the sleeve and a second capillary bore tube slidable in the sleeve. A length of dielectric optical waveguide is threaded through the first tube and partially threads the second tube. The plug consists of a capillary bore tube of similar cross-section to the second capillary bore tube, with a length of dielectric optical waveguide partially threading, and rigidly attached to the capillary bore tube. When the plug is inserted in the socket the second capillary tube slide back along the length of the dielectric optical waveguide which is thus guided into the plug capillary bore. A modification of the invention provides a plug and socket connection for simultaneously joining a large number of dielectric optical waveguides.

8 Claims, 6 Drawing Figures

OPTICAL COMMUNICATIONS SYSTEMS

The present invention relates to, couplers for dielectric optical waveguides.

The terms "light" and "optical" as herein used are to be interpreted as covering those regions of the electromagnetic spectrum more usually designated as the infra-red, visible, and ultra-violet.

The term "optical fibre" is to be given the same meaning as "dielectric optical waveguide".

The ideal jointing technique for optical fibres should meet the following requirements:

A. The joint produced should have a high transmission efficiency,
B. no great skill should be required to make the joint,
C. the joint should be inexpensive,
D. the joint should be adaptable for making simultaneous connections between a large number of optical fibres, as in a cable.

Many prior art devices fail to meet one or more of the above requirements. Two examples of prior art techniques will be briefly mentioned. The first technique consists of butting the ends of the optical fibres to be joined, and fusing the ends together. This technique entails the use of elaborate positioning apparatus to enable the optical fibre to be correctly positioned prior to fusing. This requires considerable operator skill and the use of complex and expensive equipment. The second technique consists of positioning the optical fibres to be joined in a groove in a plate, sliding the ends together, positioning a second plate on top of the fibres and clamping the plates together. This technique is difficult to adapt to handle a large number of fibres simultaneously and in addition involves the use of clamps.

The present invention seeks to avoid the abovementioned disadvantages and may provide a cheap, easily used, dielectric optical coupling having a high transmission efficiency and adaptable for the simultaneous coupling of a large number of optical fibres. In its simplest form, disclosed and claimed in my copending U.S. application Ser. No. 497,095, filed Aug. 13, 1974, and now abandoned, the invention consists of a capillary bore tube, into which are inserted, from each end of the tube, the two optical fibres to be joined. The capillary base is tapered at each end to facilitate the insertion of the fibres. The fibres are pushed into the capillary bore until their ends butt. The capillary bore may be filled with a refractive index matching fluid to enhance the transmission efficiency of the coupling.

According to a first aspect of the present invention there is provided a plug and socket dielectric optical waveguide coupler for optically coupling first and second lengths of dielectric optical waveguide, comprising socket means having a body member rigidly fixed to said first length of dielectric optical waveguide, a guide member in uni-directional sliding engagement with said body member, said first length of dielectric optical waveguide disposed at least partially in a first dielectric optical waveguide guideway extending through said guide member, said guide member movable axially of said first length of dielectric optical waveguide; a plug means comprising a plug body, said second length of dielectric optical waveguide disposed partially within and rigidly fixed with respect to a second guideway extending through said plug body, said plug means adapted to engage said socket means so as to locate said first and second guideways in register and permit said first length of dielectric optical waveguide to slide into said second guideway.

According to a second aspect of the present invention there is provided a dielectric optical waveguide coupler socket comprising a body member, a guide member in uni-directional sliding engagement with said body member, a first dielectric optical waveguide guideway extending through said guide member, and dielectric optical waveguide retaining means rigidly fixed to said body member, said guide member free to move axially with respect to said dielectric optical waveguide retaining means.

According to a third aspect of the present invention there is provided a dielectric optical waveguide coupler plug comprising a plug body having a second guideway extending therethrough, said plug body adapted to engage said body member so as to locate said first and second guideways in register.

According to a fourth aspect of the present invention there is provided a plug and socket dielectric optical waveguide coupling for optically coupling a plurality of first to a plurality of second lengths of dielectric optical waveguide, comprising socket means having a body member rigidly fixed to each of said first plurality of lengths of dielectric optical waveguide, a plurality of guide members each having a first dielectric optical waveguide guideway extending therethrough, each of said guide members in uni-directional sliding engagement with said body member, each of said first lengths of dielectric optical waveguide disposed at least partially in one of said first dielectric optical waveguide guideways, said guide means movable axially of said first lengths of dielectric optical waveguide; a plug means comprising a plug member, a plurality of plug bodies in uni-directional sliding engagement with said plug member, each of said plug bodies having a second guideway extending therethrough, each of said second lengths of dielectric optical waveguide disposed partially within one of said second guideways, said plug means adapted to engage said socket means so as to locate said first and second guideways in register and permit each of said first lengths of dielectric optical waveguide to enter one of said second guideways and form an optical connection to one of said second lengths of dielectic optical waveguide.

According to a fifth aspect of the present invention there is provided a dielectric optical waveguide coupler socket comprising a body member, a plurality of guide members in uni-directional sliding engagement with said body member, each of said guide members having a first dielectric optical waveguide guideway extending therethrough, and dielectric optical waveguide retaining means rigidly fixed to said body member, each of said guide members free to move axially with respect to said dielectric optical waveguide retaining means.

According to a sixth aspect of the present invention there is provided a dielectric optical waveguide coupler plug for use with a coupling comprising a foraminate plug member having a plurality of foramina, a plug body located in a sliding fit, in each of said foramen, each plug body having a second guideway extending therethrough, said foraminate plug member adapted to co-operate with said body member so as to locate each of said first guideways in register with one of said second guideways.

Embodiments of the invention will now be described by way of example with reference to the accompanying drawings in which.

A pair of dielectric optical waveguides may be coupled together as disclosed and claimed in my copending application Ser. No. 497,095, now abandoned, by forming a high efficiency butt-joint inside a narrow bore glass capillary tube or capillary bore tube having a bore diameter which is a few microns larger than the diameter of the fibres to be joined.

In order to facilitate the threading of the fibres into the capillary tube it is necessary to taper out the bore at the ends of the tube. This may be done by either of the following methods:

1. Etching: the capillary tube is filled with water and immersed in an etching solution consisting of 80% hydrofluoric acid and 20% sulphuric acid. The water prevents the etching solution being drawn into the tube by capillary action. After 10 to 15 minutes in the solution the tube is found to have well defined tapers at each end.
2. Blowing: large tapers are easily formed using a glass blowing technique. The sealed end of a capillary tube is heated and a bubble blown using compressed air. On cutting through the bubble the tube is left with a smoothly tapered input. A taper is formed at the other end of the tube in a similar manner.

Figure 1:
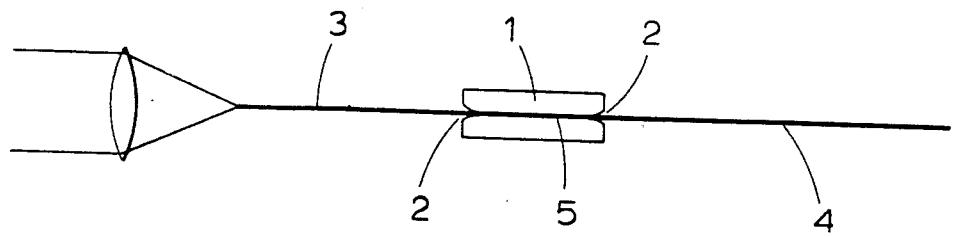
FIG. 1 illustrates diagrammatically part of an optical communications system employing a coupling according to the invention.

Referring now to the drawings, and FIG. 1 in particular, a capillary bore tube 1 having a capillary bore 5, which acts as a guideway, with tapers 2 formed at each end is filled with an immersion oil which acts as an index matching liquid, and the dielectric optical waveguides 3 and 4 are inserted into the capillary bore 5 from both ends. The dielectric optical waveguides are pushed in until the ends butt against each other. The capillary bore 5 holds the ends of the dielectric optical waveguides so that the cores are in register, i.e. so that the cross-sectional areas of the two cores are substantially lined up with each other. The immersion oil reduces the refractive index mismatch at the ends of the two fibres, and increases the optical efficiency of the coupling, this ensures a good optical connection so that light is transmitted from one dielectric optical waveguide to the other dielectric optical waveguide with minimal attenuation.

The ends of the dielectric optical waveguides are prepared by the "scratch and pull" method, in which the optical fibre is scored by a hard material, e.g., diamond, and then pulled until it breaks. Such breaks are clean and substantially transverse to the fibre axis. The quality of the resulting end faces of the dielectric optical waveguides can be assessed from the symmetry of the radiation pattern when projected onto a screen.

For multi-mode dielectric optical waveguides having an outside diameter of 102 microns, and a tube with a capillary bore of diameter 110 microns, optical efficiencies for the coupling defined by the ratio of input to output power, in the range 87% to 95% have been obtained. For multi-mode dielectric optical waveguides having an outside diameter of 102 microns and a tube with a capillary bore diameter of 120 microns, optical efficiencies in the range 90% to 94% have been obtained.

Figure 2:
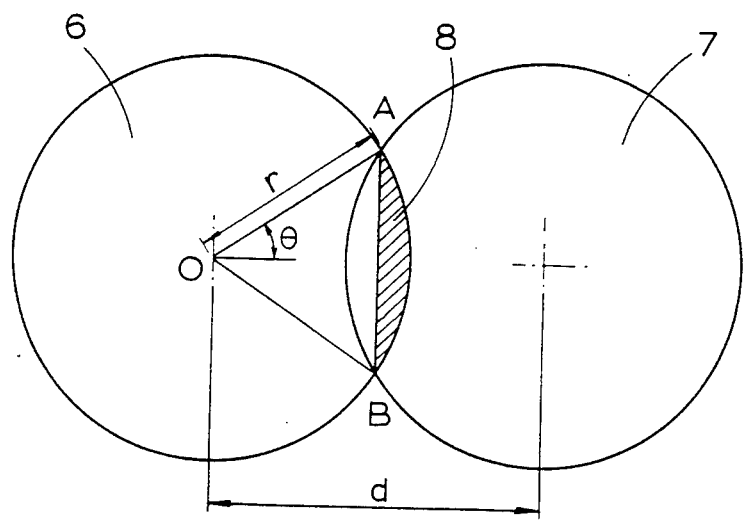
FIG. 2 shows the region of overlap between two dielectric optical waveguides in a dielectric optical waveguide coupling according to the invention.

When forming a coupling, care is necessary to avoid all contamination and the formation of air bubbles in the oil, since these effects can cause a serious loss of optical efficiency. The coupling efficiency of a coupling is affected by the degree within which the dielectric optical waveguide cores are in register. A theoretical estimate of the coupling efficiency can be obtained by considering the percentage overlap of the two fibres, 6 and 7, see FIG. 2.

| | |
|---|---|
| Area of triangle OAB | $= d/2 \, [r^2 - d^2/4]^{1/2}$ |
| Area of sector OAB | $= \pi r^2 \theta/180 = \pi r^2 \cos^{-1}[d/2r]/180$ |
| Area of shaded area 8 | $= \pi r^2 \cos^{-1}(d/2r)/180 - d/2 \, [r^2 - d^2/4]^{1/2}$ |
| % overlap | $= 2 \, [\cos^{-1}(d/2r)/180 - d/2\pi r^2 (r^2 - d^2/4)^{1/2}] \times 100$ |

Therefore the expression for the optical efficiency of the coupling is:

$$\text{Efficiency} = 2 \, [\cos^{-1}(d/2r)/180 - d/2\pi r^2 \cdot (r^2 - d^2/4)^{1/2}] \times 100\%$$

Where $r$ is the radius of the fibre core and $d$ is a measure of the misalignment of the two dielectric optical waveguides. No account is taken of any refractive index mismatch at the fibre end. Applying the above expression to the two cases referred to previously yields the following results:

1. Outside diameter of dielectric optical waveguide 102 microns, core diameter of dielectric optical waveguide 97 microns, capillary bore diameter 110 microns, theoretical jointing efficiency 89%.
2. Outside diameter of dielectric optical waveguide 102 microns, core diameter of dielectric optical waveguide 97 microns, capillary bore diameter 120 microns, theoretical jointing efficiency 76%.

Both theoretical estimates are low compared with the corresponding measured efficiencies. The theoretical estimates are the minimum jointing efficiencies to be expected in each case neglecting effects other than misalignments. It therefore seems that some self alignment of the dielectric optical waveguide occurs within the capillary tube. This is most likely the result of some surface tension effect due to the presence of immersion oil.

The technique described above for coupling together a pair of dielectric optical waveguides appears to have the potential of producing high efficiency joints between multi-mode dielectric optical wavegudes without the use of sophisticated alignment techniques. Preferably handling of the dielectric optical waveguides should be minimised or eliminated since handling can easily lead to contamination or breakage of the dielectric optical waveguides. The ideal arrangement is one in which the joint can be made without the necessity of handling the dielectric optical waveguide except under the relatively ideal conditions that exist in a factory.

Figure 3:
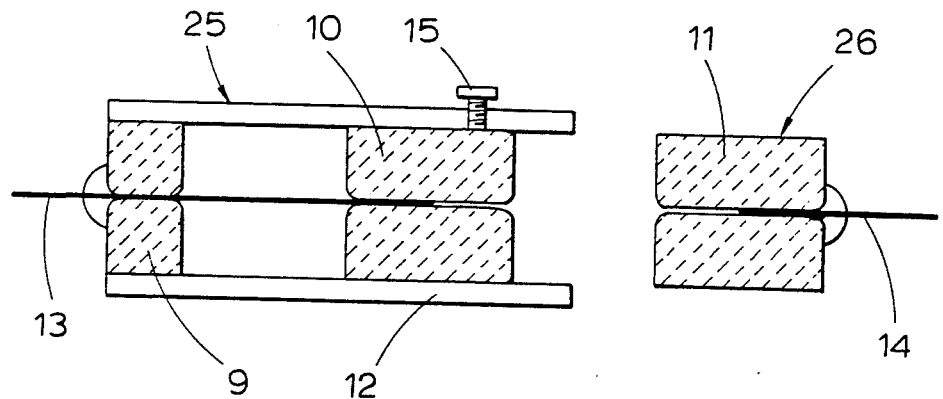
FIG. 3 shows a section through a dielectric optical waveguide coupler for a single pair of dielectric optical waveguides prior to coupling the waveguides.
Figure 4:
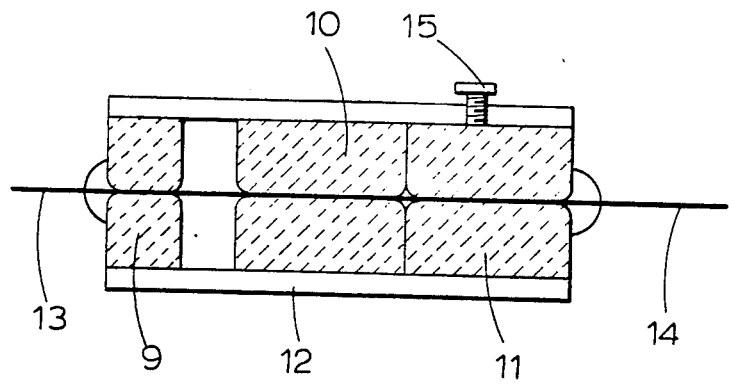
FIG. 4 shows a section through a dielectric optical waveguide coupling for a single pair of dielectric optical waveguides after coupling the waveguide.

FIGS. 3 and 4 illustrate a simple method of coupling which overcomes the necessity of handling the dielectric optical waveguides at the time when the joint is formed. The joint consists of three pieces of narrow bore capillary tube 9, 10 and 11, having outwardly tapered bores adjacent ends of the tube, and a metal sleeve 12. The tubes 9 and 10 have a bore diameter which is more than 20 microns larger than the diameter of the dielectric optical waveguides 13 and 14. Tube 9 is cemented inside the metal sleeve 12 and is used to rigidly retain the dielectric optical waveguide 13 in the socket 25, but tube 10, which acts as a guide member for the dielectric optical waveguide 13, is free to slide uni-directionally within the sleeve. Tube 11 which forms the plug 26, has a bore diameter which is a closer fit to the dielectric optical waveguide 13, being typically less than 15 microns larger than the dielectric optical waveguide diameter. All the tubes 9, 10 and 11 have tapers at each end. The two elements of the joint are prefabricated in the following manner. The dielectric optical waveguide ends to be joined are prepared by the scratch and pull method. Dielectric optical waveguide 14 is threaded into tube 11 where it is held in position by epoxy resin. Dielectric optical waveguide 13 is threaded through the tube 9 into tube 10 which is held temporarily in place in the sleeve 12 by a screw 15. The dielectric optical waveguide is held in tube 9 by epoxy resin.

When the joint is to be formed tube 11 which has been previously filled with immersion oil, is inserted into the metal sleeve. After releasing the locking screw the tube 10 is pushed towards tube 9. In this way the tube 11 is threaded on the dielectric optical waveguide 14 until the two dielectric optical waveguides 14 and 15 come into contact. The tube 11 is then locked into position inside the metal sleeve 12.

The ease with which the tube 11 can be threaded onto dielectric optical waveguide 14 is a result of the use of tapers on tubes 10 and 11. The tapers ensure that threading of a dielectric optical waveguide into tube 11 can occur without the necessity of it having the holes in tubes 10 and 11 precisely aligned. This method has the great advantage of using components that require no great precision in their manufacture.

By placing a sealing cap over the end of each joint element after it has been constructed in the factory, the enclosed dielectric optical waveguides are completely protected from breakage and contamination prior to the joirt finally being formed.

Figure 5:
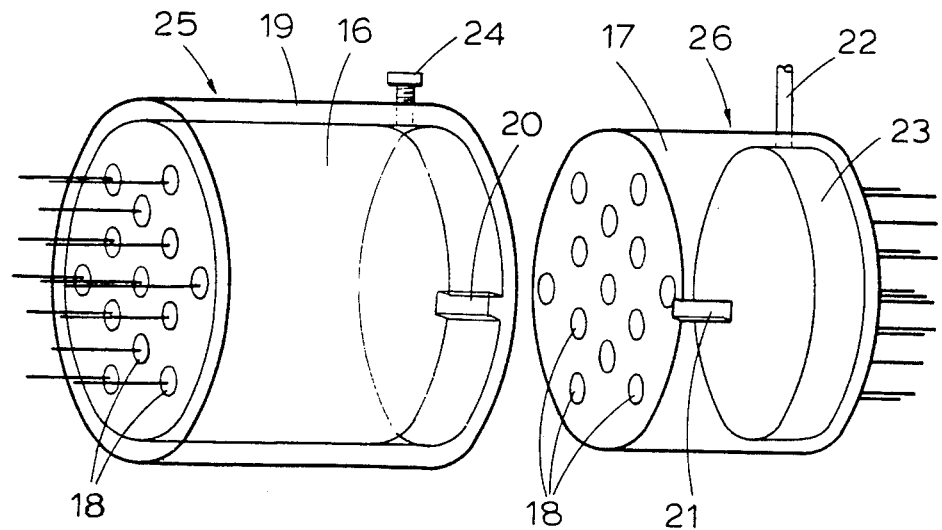
FIG. 5 shows a dielectric optical waveguide coupler for a plurality of pairs of dielectric optical waveguides.
Figure 6:
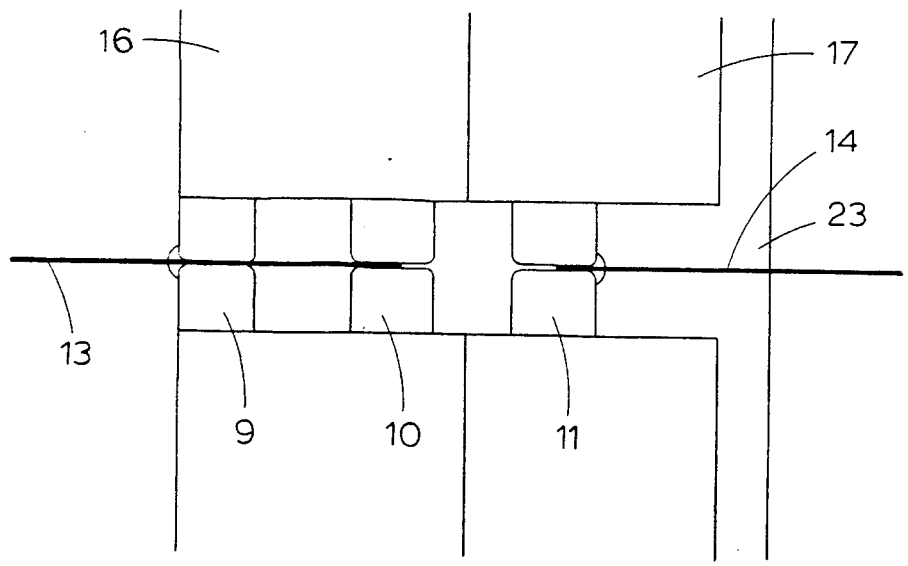
FIG. 6 shows a section of the dielectric optical waveguide coupler of FIG. 5 through a single pair of dielectric optical waveguides.

When a number of dielectric optical waveguide pairs are to ⌣e joined one of two methods can be used:

A number of single pairs of joints, or a single multi-pair joint. If several single pair joints are used each pair of dielectric optical waveguides is joined using the technique described above. It would probably be necessary to stagger the position of the joints over a short distance to ensure that the diameter of the cable did not increase significantly over the jointing section. If a single multi-pair joint is used the object is to produce joints between a number of dielectric optical waveguides simultaneously. One possible method of dealing with this problem is shown in FIGS. 5 and 6. The joint consists of two formaminate cylinders 16 and 17 each containing a number of holes or foramina 18. Cyliner 16 enclosed in sleeve 19 acts as a socket 25, and cylinder 17 acts as a plug 26. When the two cylinders are locked together the holes in one cylinder align with those in the other. This is achieved by means of the key 20 located on the inside of sleeve 19 surrounding cylinder 16, and keyway 21 cut in cylinder 17. When the plug is engaged in the socket, key 20 engages in keyway 21. The plug and socket are held together by screw 24.

Each hole or foramen has the same function as the metal sleeve in the single dielectric optical waveguide coupling technique and the coupling is formed in the same way, as can be seen from FIG. 6 in which like reference numerals are used for parts corresponding with those parts described with reference to FIGS. 3 and 4. The rear end of cylinder 17 is connected to a chamber 23 into which compressed air can be fed via an inlet pipe 22. The compressed air forces the tubes 11 out of the holes in cylinder 17 and into the holes in cylinder 16 so that the dielectric optical waveguides 13 enter tubes 11 and form an optical connection with the dielectric optical waveguides 14.

Although all the embodiments describe the coupling of dielectric optical waveguides of the same diameter, the invention is applicable to dielectric optical waveguides of different diameters provided the difference in diameter is not too great.

What I claim is:

1. A plug and socket for optically coupling first and second lengths of dielectric optical waveguide, said lengths having substantially identical end sections, comprising:

socket means having a body member rigidly affixed therein, said body member having an unobstructed capillary bore therethrough extending axially of said socket means;

a first length of dielectric optical waveguide rigidly supported in said bore and extending beyond said body and into said socket means;

a guide member slidably received within said socket spaced axially from said body and having an unobstructed capillary bore aligned with said body bore, said first length of waveguide extending at least partially therethrough;

a plug, sized to be slidably received within said socket means, said plug also having an unobstructed capillary bore therethrough which aligns with said other bores when said plug is positioned within said socket; and a second length of waveguide rigidly supported partially within said plug bore;

whereby, when said plug is inserted into said socket into contact with said guide member, further movement of said plug into said socket is effective to move said guide towards said body member, insert said first waveguide into the bore of said plug and finally abut the ends of said first and second waveguides within said plug.

2. A coupler as defined by claim 1 in which said bore in said guide member tapers outwardly at at least one end thereof.

3. A coupler as defined in claim 1 in which said body member, said guide member and said plug are each glass.

4. A coupler as defined by claim 1 including means on said socket for retaining said plug therein.

5. A plug and socket for optically coupling a first to a second plurality of lengths of dielectric optical waveguides comprising:

socket means including a sleeve having a foraminous cylinder rigidly received therein, said cylinder having a plurality of parallel foramina extending axially therethrough;

a plurality of first body members each having an unobstructed capillary bore extending axially therethrough parallel to the axis of said foramina and one of said body members being rigidly received in each said foramina respectively;

a first plurality of lengths of dielectric optical waveguide, one rigidly received in the bores of each said body members respectively and extending beyond said body members axially into said foramina;

a plurality of guide members one slidably received within each foramina respectively, spaced from said body members and having unobstructed bores therethrough aligned with the bores of said body members, one of said first lengths of waveguide extending at least partially into one each said guide members respectively;

a foraminous plug received within said socket, said plug having a number of foramina equal to the number in said socket, said socket and said plug having means insuring alignment of said foramina when in assembled relation;

an unobstructed second plurality of body members each having a capillary bore therethrough and one slidably received in each foramina in said plug respectively;

a second plurality of waveguides, one rigidly supported in each said second body member respectively and extending partially therethrough;

means for holding said plug and socket in assembled relationship;

and means affording connection of an actuable biasing mean for forcing said second plurality of body members outwardly of the foramina in said plug into the foramina in said cylinder;

whereby said plugs first contact said guide members and then move said guide members towards said body members until said first plurality of waveguides enter the bores of said second plurality of body members and finally abut said second plurality of waveguides with said second plurality of body members.

6. A coupler as defined by claim 5 in which said capillary bores in said guide members taper outwardly at at least one end thereof.

7. A coupler as defined by claim 6 in which said capillary bores in said second plurality of body members taper outwardly at at least that end thereof not filled with waveguide.

8. A coupler as defined by claim 5 in which said actuable biasing means comprises a chamber adapted to receive a pressurized fluid, said chamber communicating with each foramin of said plug on that end remote from said socket.

* * * * *